(12) United States Patent
Choi (10) Patent No.: US 10,272,375 B2
(45) Date of Patent: Apr. 30, 2019

(54) FILTER MATERIAL COMPRISING AN EXPANDED POLYTETRAFLUOROETHYLENE CONTAINING LAYER AND A NATURAL FIBER CONTAINING LAYER

(71) Applicant: Kyung-Ju Choi, Louisville, KY (US)

(72) Inventor: Kyung-Ju Choi, Louisville, KY (US)

(73) Assignee: CLEAN AND SCIENCE COMPANY, LTD., Seoul (KR)

( * ) Notice: Subject to any disclaimer, the term of this patent is extended or adjusted under 35 U.S.C. 154(b) by 171 days.

(21) Appl. No.: 14/491,788

(22) Filed: Sep. 19, 2014

(65) Prior Publication Data

US 2016/0082376 A1    Mar. 24, 2016

(51) Int. Cl.
*B01D 39/16*    (2006.01)
*B01D 39/18*    (2006.01)

(52) U.S. Cl.
CPC ......... *B01D 39/18* (2013.01); *B01D 39/1615* (2013.01); *B01D 39/1623* (2013.01); *B01D 39/1692* (2013.01); *B01D 2239/065* (2013.01)

(58) Field of Classification Search
CPC .. B01D 39/16; B01D 39/163; B01D 39/2017; B01D 2239/216; B01D 39/1615; B01D 39/1623; B01D 39/1692; B01D 39/18; B01D 2239/0216; B01D 2239/065; B32B 5/26

See application file for complete search history.

(56) References Cited

U.S. PATENT DOCUMENTS

| | | | | |
|---|---|---|---|---|
| 5,881,521 | A * | 3/1999 | Porter | B32B 5/26 428/343 |
| 6,171,684 | B1 * | 1/2001 | Kahlbaugh | B01D 27/06 428/212 |
| 8,641,796 | B2 * | 2/2014 | Rogers | 210/505 |
| 2003/0150820 | A1 * | 8/2003 | Dussaud | B01D 53/02 210/501 |
| 2006/0292947 | A1 * | 12/2006 | LaVietes | B01D 39/163 442/49 |
| 2008/0245041 | A1 * | 10/2008 | Choi | B01D 39/163 55/524 |
| 2009/0235625 | A1 | 9/2009 | Bansal et al. | |
| 2010/0258497 | A1 * | 10/2010 | Morita | B01D 63/06 210/323.2 |
| 2011/0062077 | A1 | 3/2011 | Choi | |

(Continued)

OTHER PUBLICATIONS

PCT/US2015/019896 International Search Report and Written Opinion, dated May 29, 2015, Kyunc-Ju Choi.

*Primary Examiner* — Jason M Greene
(74) *Attorney, Agent, or Firm* — Steve Witters; Witters & Associates (57) ABSTRACT

A fluid filter material configured to have a desirable efficiency at a low pressure drop is presently disclosed. The fluid filter material has a relatively open pleatable scrim comprised of a wet-laid or dry-laid material with natural and synthetic fibers. A layer of expanded polytetrafluoroethylene filaments have a first surface bonded with the pleatable scrim and the fluid filter material is pleatable and self-supporting. The natural fibers in the scrim may comprise cellulosic fibers, cotton, rayon, or other natural fibrous materials. The scrim may also comprise synthetic fibers.

20 Claims, 5 Drawing Sheets

(56) References Cited

U.S. PATENT DOCUMENTS

| | | | |
|---|---|---|---|
| 2011/0123796 A1* | 5/2011 | Auman | C08G 73/1007 |
| | | | 428/337 |
| 2011/0206564 A1* | 8/2011 | Parent | B01D 39/1623 |
| | | | 422/177 |
| 2013/0008846 A1 | 1/2013 | Rogers et al. | |
| 2013/0030340 A1 | 1/2013 | Vincent et al. | |
| 2013/0125757 A1 | 5/2013 | Patel | |

* cited by examiner

FILTER MATERIAL COMPRISING AN EXPANDED POLYTETRAFLUOROETHYLENE CONTAINING LAYER AND A NATURAL FIBER CONTAINING LAYER

FIELD OF THE DISCLOSURE

This disclosure relates generally to fluid filter materials having an expanded polytetrafluoroethylene containing layer and a natural fiber containing layer.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

It is known to provide filter material having a relatively high efficiency rating commonly referred to as a High Efficiency Particulate Air (HEPA, 99.97% efficient at a 0.3 µm particle size) or ultra-low penetration air (ULPA, 99.999% efficient at a 0.12 µm particle size) or larger by having expanded polytetrafluoroethylene (ePTFE) incorporated within the filter material. However, the scrim or materials having an ePTFE containing filter material may lack desired properties. For example, an undesirable increase in pressure drop across the filter material may result during filtration.

SUMMARY

In at least one aspect of the present disclosure, a scrim is provided that is configured to bond with an ePTFE containing layer and reduce an increasing pressure drop across the filter material during filtration.

In another aspect of the present disclosure, a fluid filter material is configured to have a desirable efficiency and a low pressure drop. The fluid filter comprises a relatively open pleatable scrim comprised of nonwoven materials such as wet-laid, dry-laid, spunbond, or meltblown materials. The pleatable scrim comprises natural and synthetic fibers. A layer of expanded polytetrafluoroethylene filaments have a first surface bonded with the pleatable scrim and the fluid filter material is pleatable and self-supporting.

In a further aspect of the present disclosure, a process for making a fluid filter material is provided. The process comprises wet-laying or dry-laying a scrim comprising natural and synthetic fibers; bonding a layer of expanded polytetrafluoroethylene onto the scrim; and pleating the bonded scrim and the layer of expanded polytetrafluoroethylene.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION ePTFE filters typically allow gaseous vapor to pass easily as long as it is in a gaseous state. However, the surface tension of liquid droplets may prevent the liquid from penetrating the ePTFE film. A filter having an ePTFE film may provide several advantages such as, nonshedding of the fiber, low outgassing, high durability, and, depending on selection of media, a lower pressure drop. However, these advantages may be outweighed by its performance with regard to increased pressure drop after exposure to liquid particles and may make it unacceptable for some applications. For example, droplets of liquid may clog the voids in the ePTFE film and increase the pressure drop.

Reference will now be made in detail to the present exemplary embodiments and aspects of the present invention, examples of which are illustrated in the accompanying figures. As used herein, the term fluid means gas, liquid, or other flowable material.

Figure 1:
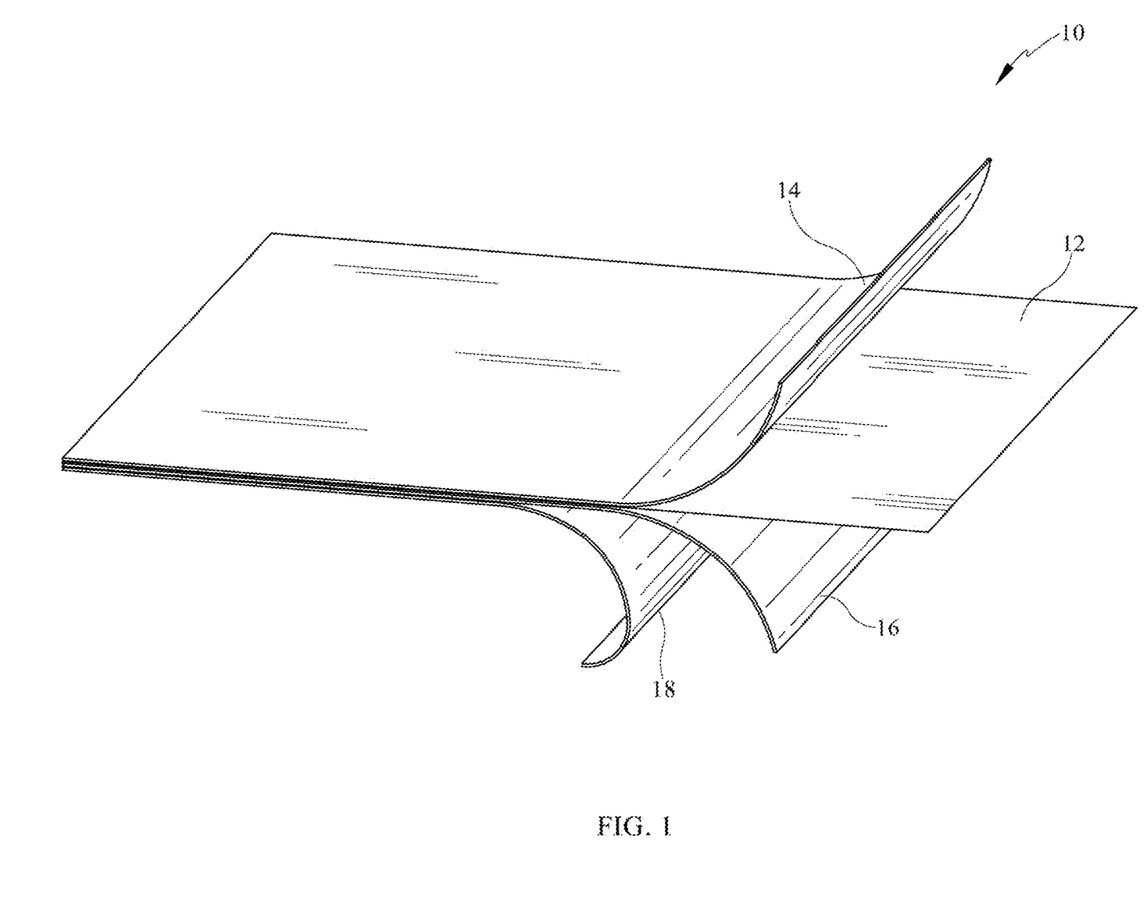
FIG. 1 is a perspective view of a delaminated portion of filtering material of the present disclosure.

FIG. 1 shows a perspective view of a delaminated portion of filtering material 10 of the present disclosure. Fluid filter material 10 has a layer of porous ePTFE film or filaments 12 with a pleatable scrim layer 14 on, or adjacent, a surface thereof. Advantageously, scrim layer 14 comprises a nonwoven material such as wet-laid or dry-laid material. For example, scrim layer 14 may be a wet-laid web formed by dispersing fibers in liquid and then laying the fibers on a wire mesh to remove the liquid and form a web. The web may be transferred to one or more drums or belts for drying and/or heating. Alternatively, scrim layer 14 may be a dry-laid web and may be formed by first opening, mixing, and blending staple fibers. The fibers may then be carded and laid to form a dry-laid web.

In at least one aspect of the present disclosure, fluid filter material 10 is configured to have a desirable efficiency at a low pressure drop. The efficiency may be desired to be tailored, for example the desired efficiency may be in a range of 40% to 99.999995% at a most penetrating particle size. Pleatable scrim layer 14 may be a relatively open pleatable scrim comprised of a wet-laid or dry-laid material wherein the wet-laid or dry-laid material comprises both natural and synthetic fibers. The layer of expanded polytetrafluoroethylene filaments 12 has a first surface bonded with pleatable scrim 14, and fluid filter material 10 is pleatable and may be self-supporting. Fluid filter material 10 may have layer of expanded polytetrafluoroethylene filaments 12 on a downstream fluid flow surface or upstream fluid flow surface of pleatable scrim 14.

The natural fibers in pleatable scrim 14 may comprise cellulosic fibers. For example, the natural fibers in pleatable scrim 14 may comprise cotton. Alternatively, or additionally, the natural fibers in pleatable scrim 14 may comprise rayon, silk, or wool for example. In at least one aspect of the present disclosure, pleatable scrim 14 comprises the natural fibers in a range of about 0.5% to about 20%, with a balance of the fibers being synthetic. For example, pleatable scrim 14 may comprise the natural fibers at about 15%. In at least one aspect of the present disclosure, pleatable scrim 14 may comprise the natural fibers at about 15% and the natural fibers may be cellulosic.

Pleatable scrim 14 may comprise synthetic fibers in a range from about 80% to about 99.5%. For example, pleatable scrim 14 may comprise about 85% synthetic fibers. The synthetic fibers may be between about 0.1 to about 20 denier. The synthetic fibers may comprise bi-component fibers in a range of 10% to 100% and the remainder of synthetic fibers may be single component fibers. In at least one aspect of the present disclosure, the synthetic fibers in pleatable scrim 14 comprise about 40% bi-component fibers. The bi-component fibers may comprise a high melting point portion and a low melting point portion. The high melting point portion of the bi-component fibers may be polyester and the low melting point portion may be polyethylene or co-polyester. In at least one aspect of the present disclosure, the low melting point portion is polyethylene. The bi-component fibers may cause adhesion to the layer of expanded polytetrafluoroethylene filaments 12, with the application of heat.

Fluid filter material 10 may have a second scrim 16 bonded therewith. For example, second scrim 16 may be bonded with a second side of the layer of expanded polytetrafluoroethylene filaments 12. Scrim 16 may comprise bi-component fibers which may cause adhesion to the layer of expanded polytetrafluoroethylene filaments 12, with the application of heat.

Fluid filter material 10 may have a third scrim 18 bonded therewith. For example, third scrim 18 may be bonded to second scrim 16 and may comprise any material(s) that are suitable for bonding with second scrim 16, as known by persons having ordinary skill in the art. Third scrim 18 may be bonded with second scrim 16 in a variety of ways. For example, third scrim 18 may be bonded to second scrim 16 in a variety of ways which may include, but not limited to, bonding with adhesives, bi-component fibers, spunbond, or even meltblown.

Fluid filter 10 may have a desired efficiency in a range of 40% to 99.999995% at a most penetrating particle size. For example, it may be desirable for fluid filter 10 to have an efficiency of about 50% at a most penetrating particle size. Alternatively, fluid filter 10 may be 99.97% efficient at a 0.3 μm particle size. Additionally or alternatively, fluid filter 10 may have a permeability in a range of 2 to 400 cfm/sq ft. A scrim 14, 16, 18, or a combination of the scrims, may provide a basis for filter material 10 to be self-supporting and may impart filter material 10 with other desirable attributes. For example, fluid filter material 10 may have a Gurley stiffness of at least 500 mg. Fluid filter 10 may be made by wet-laying or dry-laying scrim 14, comprising natural and synthetic fibers, and bonding onto the layer of expanded polytetrafluoroethylene 12. In at least one aspect of the present disclosure, scrim 14 comprises bi-component fibers and is bonded onto the layer of expanded polytetrafluoroethylene 12 by applying heat. Other layers of scrim may be bonded to the layer of expanded polytetrafluoroethylene 12 and/or scrim 14 to impart fluid filter material 10 with other or additional desired properties. The bonded layers of materials may then be pleated.

Figure 2:
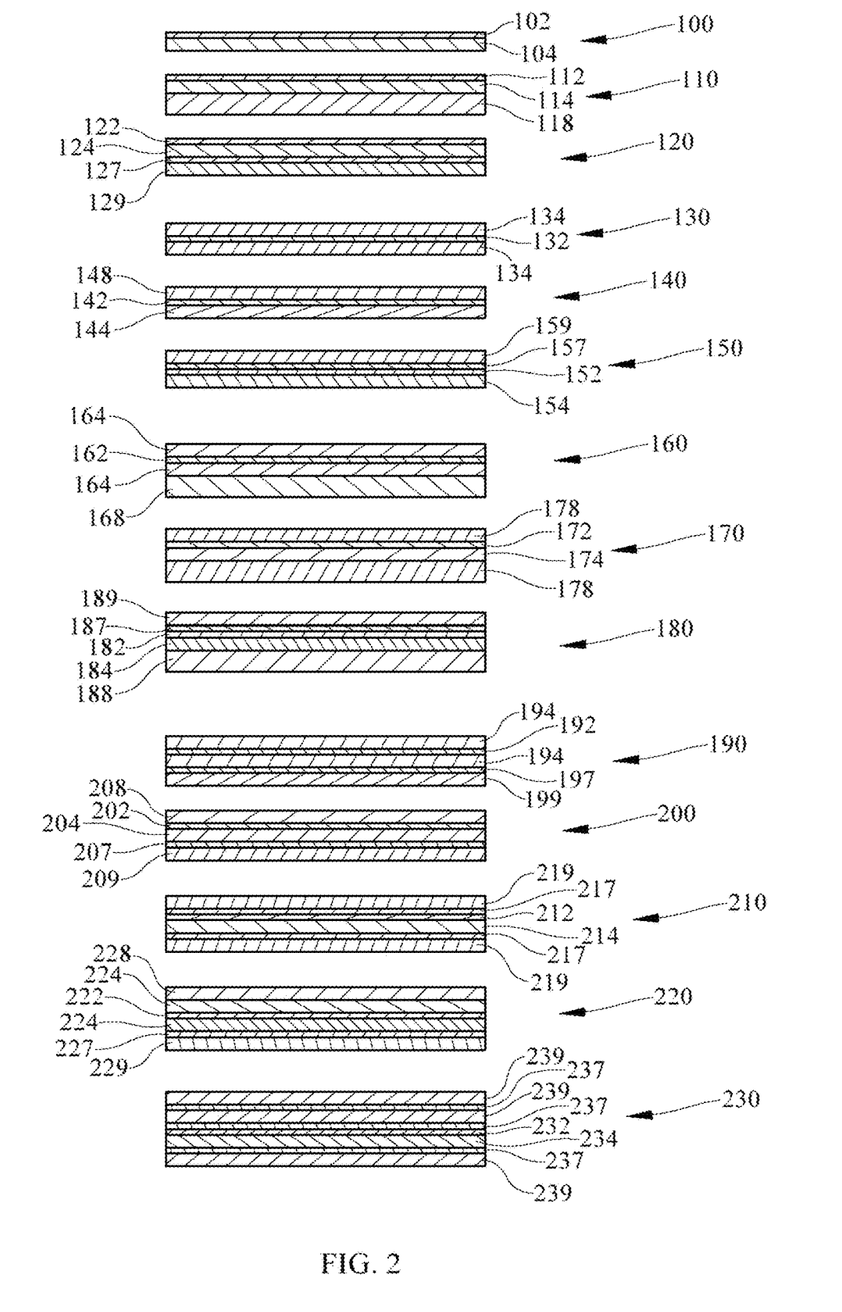
FIG. 2 shows cross-sectional views of portions of filtering material of the present disclosure.

FIG. 2 shows cross-sectional views of portions of filtering material 100. 110, 120, 130, 140, 150. 160. 170, 180, 190, 200, 210, 220, and 230 of the present disclosure. A preferred direction of filtration or fluid flow for each of the filtering materials shown in FIG. 2 may be fluid entering the top surface and then filtering through the bottom surface. However, it is to be understood that filtration in the opposite direction is within the scope of the present invention. Therefore, as described herein, it is to be understood that the first or second flow through surface of the ePTFE layer may be the upstream surface, depending on positioning of the filter material in a filtering system.

In order to increase filter life, a meltblown layer or bulky synthetic nonwoven material may be laminated with an ePTFE layer on the air entering side which may provide depth filtration. In at least one aspect of the present disclosure, a natural fiber containing layer is laminated or bonded to the ePTFE on the air leaving side. In at least one other aspect of the present disclosure, any layer may be laminated or bonded on air entering side. Adhesive may be applied to ePTFE layer to laminate a meltblown layer, other layer, on air entering side as well. For example, a filter material may comprise ePTFE layer+natural fiber containing layer+depth layer (meltblown). The depth layer may be provided on an air entering side. In at least one aspect of the present disclosure, a depth layer of nonwovens, such as meltblown, scrim is on an upstream side of an ePTFE layer. Adhesives, such as ethylene vinyl acetate (EVA) and low melt polyethylene or polyethylene (PE), for example, may be used between scrims. Additionally, or alternatively, bi-component fibers may be used to form bond(s) between natural fiber containing layer(s) and/or depth layer(s) and/or an ePTFE containing layer.

FIG. 2 shows fluid filter material 100 has ePTFE layer 102 bonded with natural fiber containing pleatable scrim or natural fiber containing scrim or layer 104. Advantageously, pleatable scrim 104 is on a downstream fluid flow surface of fluid filter material 100. However, it is to be understood that pleatable scrim 104 may be on an upstream fluid flow surface of fluid filter material 100.

Fluid filter material 100 has an upstream and downstream surface and may be configured to obtain a desirable minimum efficiency at a low pressure drop. Scrim layer 104 may be a relatively open pleatable self-supporting scrim comprised of a wet-laid or dry-laid material. Pleatable scrim layer 104 may comprise natural and synthetic fibers. For example, scrim layer 104 may comprise cellulosic, cotton, and/or rayon fibers. In at least one aspect, scrim layer 104 comprises cellulosic fibers.

Scrim layer 104 may comprise natural fibers in a range of about 0.5% to about 20%, in increments of 1% or fractions of a percent. For example, pleatable scrim 104 may comprise natural fibers in a range of about 15%, with a remainder of fibers being synthetic. In at least one embodiment, the natural fibers comprise cellulosic fibers, cotton, rayon, silk, wool, or a combination thereof. In at least one other aspect of the present disclosure, pleatable scrim 104 comprises natural fibers at about 15% and the natural fibers are cellulosic fibers. In at least one further aspect of the present disclosure, filter material 100 has a Gurley stiffness of at least 500 mg.

Pleatable scrim 104 is adjacent the layer of porous ePTFE film, 102, and may comprise synthetic fibers up to about 99.5%, advantageously between about 80% to 99.5%, in increments of 1% or fractions of a percent. For example, pleatable scrim 104 may comprise synthetic fibers in a range of about 85%, with a remainder of fibers being natural fibers. The synthetic fibers may comprise single component fibers, bi-component fibers, or a combination thereof. For example, pleatable scrim 104 may comprise synthetic fibers having bi-component fibers in a range of 20% to 100%, with the remainder of synthetic fibers being single component fibers. In at least one aspect of the present disclosure, pleatable scrim 104 may comprise synthetic fibers, wherein about 40% of the synthetic fibers are bi-component fibers. The bi-component fibers may comprise a high melting point portion and a low melting point portion, the high melting point portion may be polyester and the low melting point portion may be polyethylene or co-polyester. Advantageously, pleatable scrim 104 may comprise bi-component fibers having a polyester core and a polyethylene sheath. Alternatively, pleatable scrim 104 may comprise bi-component fibers having polyester core and a co-polyester sheath.

Fluid filter material 100 has pleatable scrim 104 adjacent porous ePTFE film or layer 102. Fluid filter material 100 may be configured to have an efficiency greater than about 40% and less than HEPA, in a range of 40% to 99.999995% at a most penetrating particle size, at most 99.97% at a particle size of 0.3µ (<=HEPA), at least 99.97% at 0.3µ (>=HEPA), or ultra-low penetration air, ULPA, which may have an efficiency of 99.999% at a particle size of 120 nanometers (0.12 µm) or larger, depending upon the desired application of filter material. Fluid filter material 100 may be configured to have permeability in a range of 2 to 400 cfm/sq ft. Fluid filter material 100 may be configured to have pleatable scrim 104 on an upstream or downstream fluid flow surface. In at least one aspect of the present disclosure, fluid filter material 100 has pleatable scrim 104 adjacent a downstream fluid flow surface of porous ePTFE film or layer 102.

Pleatable scrim natural fiber containing layer 104 may be a non-woven layer of material. For example, scrim 104 may be wet-laid or dry-laid. Scrim 104 may comprise carded non-woven fibrous materials such as melt bonded carded non-woven material or fuse bonded carded non-woven materials. Scrim layer 104 may have single component fibers, bi-component fibers, or a mixture of both single component fibers and bi-component fibers. In at least one aspect of the present disclosure, scrim 104 has bi-component fibers in a range of 20% to 100% with the remainder being single component fibers. The bi-component fibers have a high melting point portion and a low melting point portion, for example, the high melting point portion may be polyester and the low melting point portion may be polyethylene or co-polyester. In at least one aspect of the present disclosure, scrim 104 has bi-component fibers with a polyester core and a polyethylene sheath. In at least one aspect of the present disclosure, scrim 104 comprises fibers (single component or bi-component) having a melting point below a melting point of ePTFE. The lower melting point fibers may allow scrim 104 to be bonded with ePTFE layer 102 with the application heat.

Embodiments of filter material 100 having a higher efficiency, porous ePTFE film or layer 102 may have much smaller fiber size, voids, or void spaces than scrim layer 104. The extent of expansion or stretching of porous ePTFE film 102 may be proportional to the efficiency of filter material 100. However, it is to be understood that in some aspects of the present disclosure, filter material 100 may have a lower efficiency and/or scrim layer 104 may have a smaller void size than ePTFE film 102 and the void size of scrim layer 104 may define the efficiency of filter material 100. For example, filter material 100 may have an efficiency greater than about 40% and less than HEPA, in a range of 40% to 99.999995% at a most penetrating particle size, at most 99.97% at a particle size of 0.3µ (<=HEPA), at least 99.97% at 0.3µ (>=HEPA), or ultra-low penetration air, ULPA, which may have an efficiency of 99.999% at a particle size of 120 nanometers (0.12 µm) or larger, depending upon the desired application of filter material 100. Typically, filter material 100 may have a permeability in a range of 2 to 400 cfm/sq ft.

Filter material 110 has ePTFE layer 112 bonded with natural fiber containing scrim 114. A second scrim 118 is bonded with scrim 114. Scrim 118 may be any layer that can be laminated with or bonded to scrim 114. For example, scrim 118 may be woven, non-woven, meltblown, spunbond, wet-laid, dry-laid, or other material as is known in the art that may provide additional or other desired properties to filter material 110. Scrim 118 may comprise natural and synthetic fibers or may be solely synthetic.

Filter material 120 has ePTFE layer 122 bonded with natural fiber containing scrim 124. A second scrim 129 is bonded with scrim 124 with an adhesive 127, EVA or PE, for example.

Filter material 130 has ePTFE layer 132 bonded with natural fiber containing scrim layers 134. Fluid filter material 130 has a pleatable scrim 134 adjacent a downstream and an upstream fluid flow surface of porous ePTFE film or layer 132. The combination of the three layers may be configured to provide filter material 130 with desired properties such as efficiency and self-supporting. Additionally, natural fiber containing scrim layers 134 on the downstream and upstream fluid flow surfaces of porous ePTFE film or layer 132 may have different compositions such as different natural fiber content. Each scrim layer 134 has at most 20% natural fibers.

Filter material 140 comprises ePTFE film or layer 142 having scrim 144 bonded to a first flow through surface and scrim 148 bonded with a second flow through surface. Scrim 144 is configured to bond with ePTFE film 142 and may comprise a variety of scrim materials as are known in the art. For example, scrim 144 may be a melt blown depth layer. Scrim 148 is configured to bond with ePTFE film 142 and comprises natural fibers up to 20% with the remainder being scrim materials as are known in the art.

Filter material 150 has ePTFE layer 152 having a first flow through surface bonded with scrim 159 with an adhesive 157, EVA or PE, for example. ePTFE layer 152 has a second flow through surface bonded with natural fiber containing scrim 154. Natural fiber containing scrim layer 154 comprises up to 20% natural fibers.

Filter material 160 has ePTFE layer 162 bonded with natural fiber containing scrim layers 164. Fluid filter material 160 has a pleatable scrim 164 adjacent a downstream and an upstream fluid flow surface of porous ePTFE film or layer 162. Natural fiber containing scrim layers 164, on the downstream and upstream fluid flow surfaces of porous ePTFE film or layer 132, each have at most 20% natural fibers and may have different compositions such as different natural fiber content or different synthetic fiber content. Scrim 168 is bonded with a natural fiber containing scrim layer 164, on an upstream or downstream fluid flow surface of ePTFE layer 162 and comprises any scrim material that may be bonded with a natural fiber containing scrim layer 164. The combination of the four layers may be configured to provide filter material 160 with desired properties such as stiffness, efficiency, and self-supporting.

Filter material 170 comprises ePTFE film or layer 172 having scrim 174 bonded to a first flow through surface and scrim 178 bonded with a second flow through surface. Scrim 178 is configured to bond with ePTFE film 172 and may comprise a variety of scrim materials as are known in the art. Scrim 174 is configured to bond with ePTFE film 172 and comprises natural fibers up to 20% with the remainder synthetic fibers or other scrim materials as are known in the art. A second scrim 178 is configured to bond with scrim film 174 and may comprise a variety of scrim materials as are known in the art.

Filter material 180 has ePTFE layer 182 having a first flow through surface bonded with scrim 189 with an adhesive 187, EVA or PE, for example.

ePTFE layer 182 has a second flow through surface bonded with natural fiber containing scrim 184. Natural fiber containing scrim layer 184 comprises natural fibers up to 20%. Scrim 188 is bond with natural fiber containing scrim 184 and may comprise a variety of scrim materials as are known in the art.

Filter material 190 has ePTFE layer 192 bonded with natural fiber containing scrim layers 194. Fluid filter material 190 has a pleatable scrim 194 adjacent a downstream and an upstream fluid flow surface of porous ePTFE film or layer 192. Natural fiber containing scrim layers 194, on the downstream and upstream fluid flow surfaces of porous ePTFE film or layer 192, may have different compositions such as different natural fiber content. Each scrim layer 194 has at most 20% natural fibers. Bonded with one of the scrim layers 194 is scrim 199 which is bonded with scrim 194 with an adhesive 177, EVA or PE for example. Scrim 199 may be any layer that can be bonded to scrim 194 with adhesive 197. The combination of the five layers may be configured to provide filter material 190 with desired properties such as stiffness, efficiency and self-supporting.

Filter material 200 comprises ePTFE film or layer 202 having scrim 204 bonded to a first flow through surface and scrim 208 bonded with a second flow through surface. Scrim 208 is configured to bond with ePTFE film 202 and may comprise a variety of scrim materials as are known in the art. Scrim 204 is configured to bond with ePTFE film 202 and comprises natural fibers up to 20% with the remainder synthetic fibers or other scrim materials as are known in the art. Bonded with scrim layers 204 is scrim 209 which is bonded with scrim 204 with an adhesive 207, EVA or PE for example. Scrim 209 may be any layer that can be bonded to scrim 204 with adhesive 207.

Filter material 210 has ePTFE layer 212 bonded with natural fiber containing scrim layers 214. Fluid filter material 200 has a pleatable scrim 214 adjacent a downstream and an upstream fluid flow surface of porous ePTFE film or layer 212. Natural fiber containing scrim layers 214, on the downstream and upstream fluid flow surfaces of porous ePTFE film or layer 212, each have at most 20% natural fibers and may have different compositions such as different natural fiber content or different synthetic fiber content. Scrim 218 is bonded with a natural fiber containing scrim layer 214, on an upstream or downstream fluid flow surface of ePTFE layer 212 and comprises any scrim material that may be bonded with a natural fiber containing scrim layer 214. Bonded with the other scrim layer 214 is scrim 219 which is bonded with scrim 214 with an adhesive 217, EVA or PE for example. Scrim 219 may be any layer that can be bonded to scrim 214 with adhesive 217.

Filter material 220 has ePTFE layer 222 bonded with natural fiber containing scrim layers 224. Fluid filter material 220 has a pleatable scrim 224 adjacent a downstream and an upstream fluid flow surface of porous ePTFE film or layer 222. Natural fiber containing scrim layers 224, on the downstream and upstream fluid flow surfaces of porous ePTFE film or layer 222, each have at most 20% natural fibers and may have different compositions such as different natural fiber content or different synthetic fiber content. Scrim 228 is bonded with a natural fiber containing scrim layer 224, on an upstream or downstream fluid flow surface of ePTFE layer 222 and comprises any scrim material that may be bonded with a natural fiber containing scrim layer 224. Bonded with the other scrim layer 224 is scrim 229 which is bonded with scrim 224 with an adhesive 227, EVA or PE for example. Scrim 229 may be any layer that can be bonded to scrim 224 with adhesive 227.

Filter material 230 has ePTFE layer 232 with a first flow through surface bonded with first scrim 239 with a first adhesive 237. Bonded with first scrim 239 is second scrim 239, bonded with second adhesive 237. ePTFE layer 232 has a second flow through surface bonded with natural fiber containing scrim 234. Natural fiber containing scrim layer 234 comprises up to 20% natural fibers. Bonded with natural fiber containing scrim layer 234 is third scrim 239, bonded with third adhesive 237.

Figure 3A:
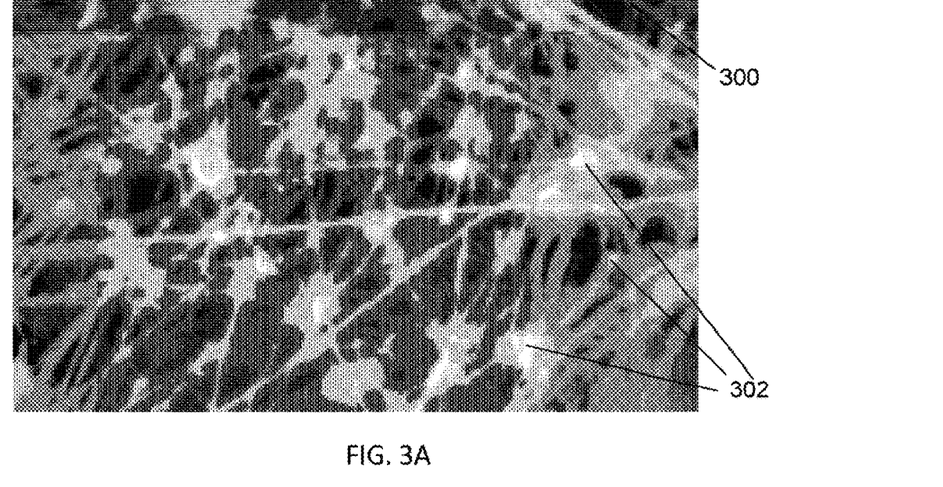
FIG. 3A shows an SEM photo micrograph of a layer of ePTFE filaments having liquid particles thereon.
Figure 3B:
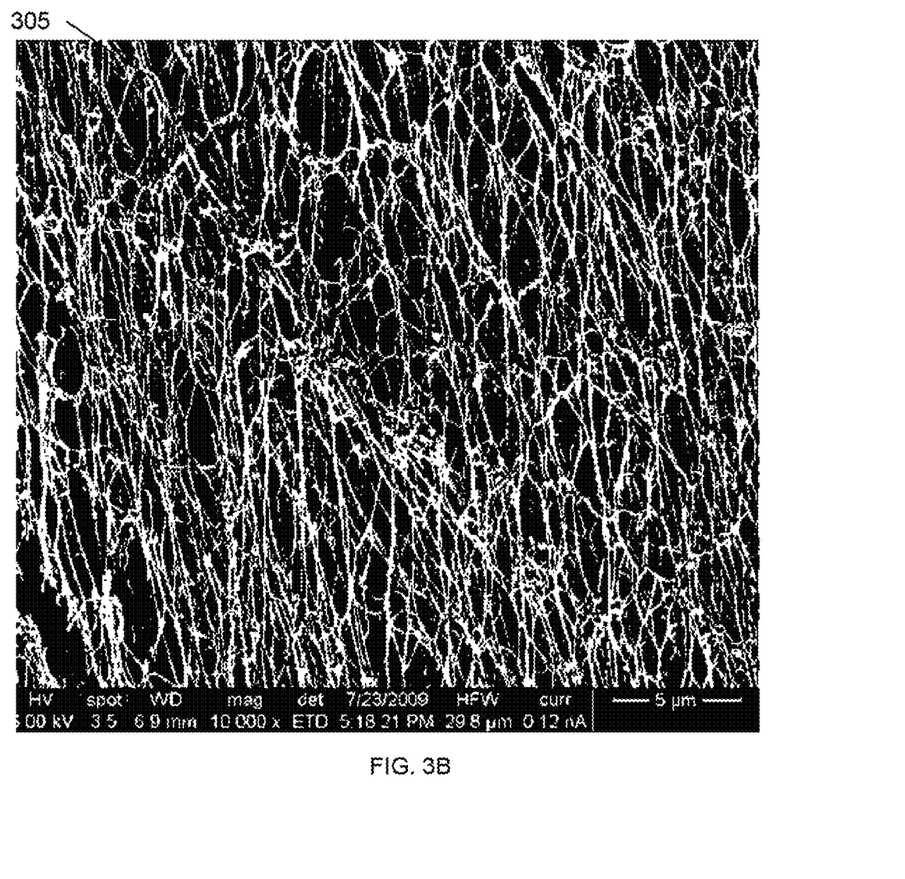
FIG. 3B shows an SEM photo micrograph of a layer of ePTFE filaments void of liquid particles.

FIG. 3A shows an SEM photo micrograph of a layer of ePTFE filaments 300. The layer of ePTFE filaments 300 shown in FIG. 3A is void of an adjacent scrim layer comprising natural fibers as disclosed herein. Shown on layer of ePTFE filaments 300 are liquid particles 302 which may clog voids in layer of ePTFE filaments 300. Aspects of the filter media of the present disclosure comprising natural fibers in a scrim layer adjacent a layer of ePTFE filaments may minimize, or even eliminate, a buildup of liquid particles on a layer of ePTFE filaments. The minimization of liquid particle build up on a layer of ePTFE filaments during filtration may provide the filter material of the present disclosure with a desired low pressure drop across the filter material during filtration. For example, FIG. 3B shows an SEM photo micrograph of a layer of ePTFE filaments 305 that may be used in an aspect of the filter material of the present disclosure. Layer of ePTFE filaments 305 is void of liquid particle buildup and may be representative of fluid filter material of the present disclosure in minimizing liquid particle build up on a layer of ePTFE filaments during filtration, thereby providing the filter material of the present disclosure with a desired low pressure drop across the filter material during filtration.

The layer of porous ePTFE film 305 may have a high melting point, chemically inert, and hydrophobic. ePTFE nano-filaments, film, or layer 305 may have a relatively high strength and a smooth surface and may have billions of continuous superfine fibrils interconnected with each other having voids therebetween. For example, biaxially stretching of a sheet of polytetrafluoroethylene may provide an ePTFE nano-filaments having a desired porosity or voids for a layer of expanded polytetrafluoroethylene filaments comprised in the fluid filter material of the present disclosure. Biaxially stretching may be performed by the first stretching longitudinally and then stretching in a transverse direction, perpendicular to the first stretching. For example, a structure of expanded poly(tetrafluoroethylene) (ePTFE) films may be produced by uniaxial and/or biaxial stretching of a calendared sheet.

An ePTFE film or nano-filaments may be provided by providing a fine powder PTFE homopolymer. Expansion of the PTFE may be accomplished by beginning with the fine PTFE powder, adding a lubricant, such as Isopar, to form a paste, which may then be extruded under high pressure and sent to a calendaring process to make PTFE tape. After drying to remove the lubricant, the tape may then be fed to the machine direction orienting (MDO) expansion (draw). The PTFE may be given only a uniaxial (constant width) draw, or may also be given a subsequent transverse direction orientation (TDO) stretch in the tenter machine to produce biaxial orientation and expansion of the PTFE.

EXAMPLES

Wet-laid scrims comprising polyethylene/polyester bi-component fibers were prepared. A first scrim was prepared void of cellulosic fibers, a second scrim was prepared with 10% cellulosic fibers, a third scrim was prepared with 15% cellulosic fibers, and a fourth scrim was prepared with 20% cellulosic fibers. The cellulosic fibers had a weight of 75+/−1 g/sq. m. The bi-component fibers were 1.1 denier (1.1 d Bico) and the polyester fibers were 7 denier (PET 7d). A layer of ePTFE was laminated onto a fluid flow surface of each prepared scrim. The thickness of laminate with ePTFE was 0.34+/−0.01 mm.

Dry-laid scrims comprising polyethylene/polyester bi-component fibers were prepared. A first scrim was prepared void of rayon, a second scrim was prepared with 10% rayon fibers, a third scrim was prepared with 15% rayon fibers, and a fourth scrim was prepared with 20% rayon fibers. The rayon fibers had a weight of 66+/−2 g/sq. m. The bi-component fibers were 1.1 denier and the polyester fibers were 7 denier. A layer of ePTFE was laminated onto a fluid flow surface of each prepared scrim. The thickness of laminate with ePTFE was 0.26+/−0.02 mm. The Fiber contents of each prepared scrim is listed in Table 1.

TABLE 1

| Wet-laid | 1.1 d Bico | PET 7d | Cellulosic |
|---|---|---|---|
| 0% | 40 | 60 | 0 |
| 10% | 40 | 50 | 10 |
| 15% | 40 | 45 | 15 |
| 20% | 40 | 40 | 20 |

| Dry-laid | 1.1 d Bico | PET 7d | Rayon |
|---|---|---|---|
| 0% | 40 | 60 | 0 |
| 10% | 40 | 50 | 10 |
| 15% | 40 | 45 | 15 |
| 20% | 40 | 40 | 20 |

As shown in Table 1, for the rows having a wet-laid or dry-laid of scrim comprising 20% natural fibers, the scrim material comprised 40 wt % of 1.1 denier PE-PET bi-component fibers, 40 wt % of 7 denier PET fibers, and 20 wt % of cellulosic or rayon fibers, for example.

A fluid, challenge aerosol, comprising PAO (polyalphaolefin) was filtered with each prepared filter material wherein the air-entering side was the side having the ePTFE layer. The filtration was performed for a period of time to obtain a substantially amount of PAO on the filter material.

Figure 4:
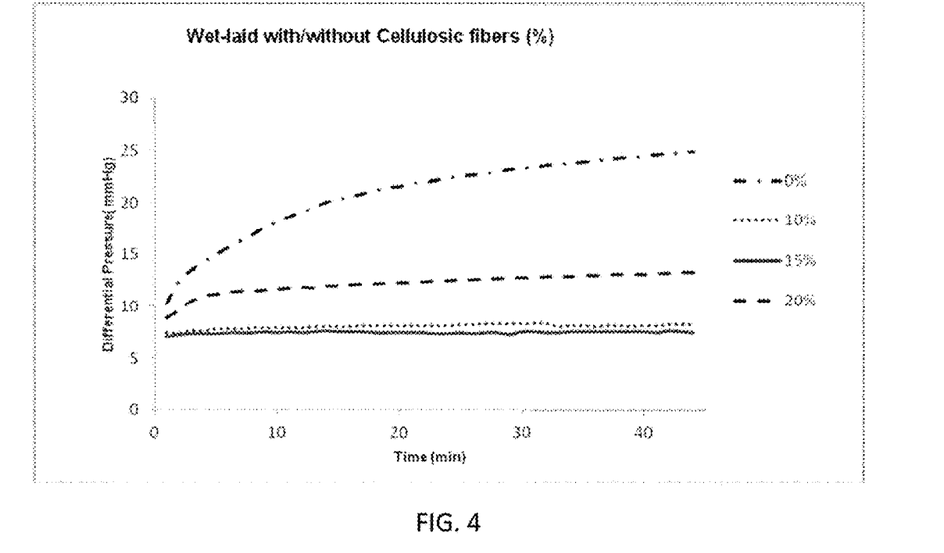
FIG. 4 graphically shows the differential pressure, over a time course, across the wet-laid filter material of the present disclosure.

FIG. 4 shows the differential pressure, or pressure drop, of the filter material having the wet-laid scrim, with selected scrims comprising cellulosic fibers. Filtration was conducted for about 45 minutes. As shown in FIG. 4, the filter material void of the natural fiber containing scrim had its pressure differential rise to about 25 mm Hg at about 45 minutes and remained increasing. Conversely, the filter material of the present disclosure comprising cellulosic fibers substantially leveled off over the filtration time course. The filter material having 20% cellulosic fibers in the scrim was shown to have less than a 15 mm Hg pressure differential at about 45 minutes. The filter material having 10% cellulosic fibers in the scrim was shown to level off within a few minutes and maintain about 8 mm Hg pressure differential. The filter material having 15% cellulosic fibers in the scrim was shown to level off within a few minutes and maintain about 7 mm Hg pressure differential. Therefore, a fluid filter material of present disclosure wherein the pleatable scrim comprises the natural fibers in a range of about 0.5% to about 20% may be advantageous and wherein the pleatable scrim comprises the natural fibers in a range of about 15% may be proximate an optimum concentration of the natural fibers. Aspects of the present disclosure may provide filter material wherein the pressure drop levels off quickly and maintains a low pressure drop.

Figure 5:
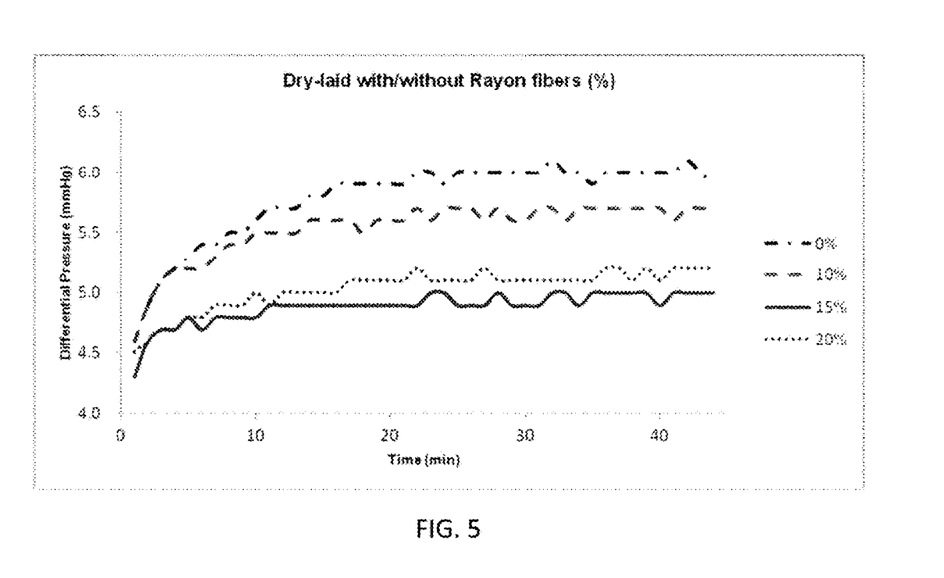
FIG. 5 graphically shows the differential pressure, over a time course, across the dry-laid filter material of the present disclosure.

FIG. 5 shows the differential pressure, or pressure drop, of the filter material having the dry-laid scrim, with selected scrims comprising rayon fibers. Filtration was conducted for about 45 minutes. As shown in FIG. 5, the filter material void of the natural fiber containing scrim had its pressure differential rise to about 6 mm Hg at about 45 minutes. Conversely, the filter material having 10% rayon fibers in the scrim was shown to have less than a 6 mm Hg pressure differential at about 45 minutes. The filter material having 20% cellulosic fibers in the scrim was shown to level off and maintain about 5.1 mm Hg pressure differential, over the filtration time course. The filter material having 15% rayon fibers in the scrim was shown to level off and maintain about 5 mm Hg pressure differential, over the same time course. Again, it was shown that a fluid filter material of present disclosure wherein the pleatable scrim comprises the natural fibers in a range of about 0.5% to about 20% may be advantageous and wherein the pleatable scrim comprises the natural fibers in a range of about 15% may be proximate an optimum concentration of the natural fibers.

A comparison of the pressure differential curves of FIGS. 4 and 5 shows smoother curves for the wet-laid material. This may be indicative of the wet-laid material having a smoother surface and/or more homogenous than the dry-laid material.

In at least one aspect of the present disclosure, a wet-laid scrim is provided with an ePTFE layer bonded therewith. A wet-laid scrim may provide a smoother surface for bonding with the ePTFE layer which may provide more consistent filtering. Additionally, wet-laid scrim may improve pleatability of the filter material.

Figure 6:
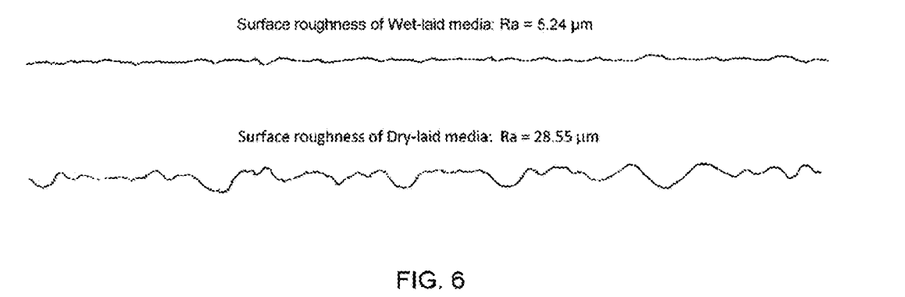
FIG. 6 graphically shows surface profiler test results for wet-laid and dry-laid filtering material of the present disclosure.

Surface Roughness of dry-laid and wet-laid materials were measured with a Mitutoyo SV-C4500H4 contact profilometer. The dry-laid material comprised 15% rayon. 40% 1.1 denier Bi-component, and 45% PET fibers and the wet-laid material comprised 15% cellulose. 40% 1.1 denier Bi-component, and 45% PET fibers. A surface profile of the roughness is graphically shown in FIG. 6. The surface height was measured at different points for each of the wet-laid and dry-laid materials and plotted as shown in FIG. 6. The variation of the plots from that of a straight line indicates roughness. The average surface roughness (Ra) of the wet-laid material was determined to be 5.24 μm and the average surface roughness (Ra) of the dry-laid material was determined to be 28.55 μm. Therefore, it is shown that the wet-laid material surface is smoother than that of dry-laid material. The smoothness of the wet-laid material may provide some advantages with some aspects of the fluid filter material or scrim material of the present disclosure. For example, the smoother wet-laid material may be advantageous for bonding or laminating with ePTFE and/or improved pleatability.

The invention claimed is:

1. A fluid filter material configured to have a desirable efficiency at a low pressure drop comprising:
   a relatively open pleatable scrim comprised of a wet-laid or dry-laid material;
   the pleatable scrim comprising natural and synthetic fibers;
   a layer consisting of expanded polytetrafluoroethylene filaments having a first surface directly bonded with the pleatable scrim; and
   the fluid filter material being pleatable and self-supporting.

2. The fluid filter material of claim 1 wherein the natural fibers comprise cellulosic fibers.

3. The fluid filter material of claim 1 wherein the natural fibers comprise cotton.

4. The fluid filter material of claim 1 wherein the natural fibers comprise rayon.

5. The fluid filter material of claim 1 wherein the pleatable scrim comprises the natural fibers in a range of about 0.5% to about 20%.

6. The fluid filter material of claim 5 wherein the pleatable scrim comprises the natural fibers at about 15%.

7. The fluid filter material of claim 1 wherein the pleatable scrim comprises the natural fibers at about 15% and the natural fibers are cellulosic.

8. The fluid filter material of claim 1 wherein the pleatable scrim is wet-laid.

9. The fluid filter material of claim 8 having an average roughness, Ra, of at most 20 μm.

10. The fluid filter material of claim 1 wherein the pleatable scrim is wet-laid material and on a downstream side of the expanded polytetrafluoroethylene, the fluid filter material further comprising a meltblown depth layer on an upstream side of the expanded polytetrafluoroethylene.

11. The fluid filter material of claim 10 wherein the fluid filter material further comprises an adhesive between the meltblown depth layer and the expanded polytetrafluoroethylene.

12. The fluid filter material of claim 10 wherein the meltblown depth layer comprises low melt polyethylene.

13. The fluid filter material of claim 1 having the desired efficiency in a range of 40% to 99.999995% at a most penetrating particle size.

14. The fluid filter material of claim 1 having a permeability in a range of 2 to 400 cfm/sq ft.

15. The fluid filter material of claim 1 having the layer of expanded polytetrafluoroethylene filaments on a downstream fluid flow surface of the pleatable scrim.

16. The fluid filter material of claim 1 having the layer of expanded polytetrafluoroethylene filaments on an upstream fluid flow surface of the pleatable scrim.

17. The fluid filter material of claim 1 having a second scrim bonded therewith.

18. The fluid filter material of claim 17 wherein the second scrim is bonded with a second side of the layer of expanded polytetrafluoroethylene filaments.

19. The fluid filter material of claim 17 wherein the second scrim is bonded with the pleatable scrim.

20. A process for making a fluid filter material comprising the steps of:
   wet-laying or dry-laying a scrim comprising natural and synthetic fibers;
   bonding a layer consisting of expanded polytetrafluoroethylene directly onto the scrim; and
   pleating the bonded scrim and the layer of expanded polytetrafluoroethylene.

* * * * *